United States Patent
Lee et al.

(10) Patent No.: US 8,351,387 B2
(45) Date of Patent: Jan. 8, 2013

(54) METHOD FOR TRANSMITTING/RECEIVING ACK/NAK SIGNAL IN AN OFDM COMMUNICATION SYSTEM

(75) Inventors: Jung Hoon Lee, Gyeonggi-do (KR); Ki Jun Kim, Gyeonggi-do (KR); Dae Won Lee, Gyeonggi-do (KR); Joon Kui Ahn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 12/680,619

(22) PCT Filed: Oct. 1, 2008

(86) PCT No.: PCT/KR2008/005778
§ 371 (c)(1),
(2), (4) Date: Jul. 27, 2010

(87) PCT Pub. No.: WO2009/045046
PCT Pub. Date: Apr. 9, 2009

(65) Prior Publication Data
US 2010/0284352 A1    Nov. 11, 2010

Related U.S. Application Data

(60) Provisional application No. 60/976,583, filed on Oct. 1, 2007, provisional application No. 60/982,436, filed on Oct. 25, 2007.

(30) Foreign Application Priority Data
Feb. 20, 2008   (KR) .................. 10-2008-0015321

(51) Int. Cl.
*H04W 4/00* (2009.01)

(52) U.S. Cl. ......... 370/329; 370/342; 370/343; 370/348

(58) Field of Classification Search .................. 370/329, 370/342, 345, 348, 343; 375/260, 267; 714/748, 714/749
See application file for complete search history.

(56) References Cited

U.S. PATENT DOCUMENTS

| 5,946,320 | A | 8/1999 | Decker |
| 6,615,382 | B1 | 9/2003 | Kang et al. |
| 8,160,172 | B2 * | 4/2012 | Zhang et al. .................. 375/267 |
| 2008/0046793 | A1 * | 2/2008 | Heo et al. ...................... 714/748 |
| 2008/0075184 | A1 * | 3/2008 | Muharemovic et al. ...... 375/260 |
| 2008/0141093 | A1 * | 6/2008 | Kwon et al. ................... 714/749 |
| 2008/0267158 | A1 * | 10/2008 | Zhang et al. .................. 370/342 |

FOREIGN PATENT DOCUMENTS

| KR | 1020050069902 | 7/2005 |
| KR | 1020050091581 | 9/2005 |

* cited by examiner

*Primary Examiner* — Hassan Kizou
*Assistant Examiner* — Toan Nguyen
(74) *Attorney, Agent, or Firm* — Lee, Hong, Degerman, Kang & Waimey

(57) ABSTRACT

A method for receiving an acknowledgement (ACK)/negative acknowledgement (NAK) signal in an orthogonal frequency division multiplexing (OFDM) communication system is described. The method includes receiving ACK/NAK signals and repetitions of the ACK/NAK signals mapped to one or more OFDM symbols which are allocated for transmission of a plurality of ACK/NAK signals within one subframe, and confirming receipt of the ACK/NAK signals. The OFDM symbol for each ACK/NAK signal is determined according to the repetition of the ACK/NAK signals, and frequency regions for the ACK/NAK signals within the OFDM symbols are different from frequency regions for the repetition of the ACK/NAK signals within the OFDM symbols.

18 Claims, 7 Drawing Sheets

METHOD FOR TRANSMITTING/RECEIVING ACK/NAK SIGNAL IN AN OFDM COMMUNICATION SYSTEM

CROSS REFERENCE TO RELATED APPLICATIONS

This application is the National Stage filing under 35 U.S.C. §371 of International Application No. PCT/KR2008/005778, filed on Oct. 1, 2008, which claims the benefit of earlier filing date and right of priority to Korean Application No. 10-2008-0015321, filed on Feb. 20, 2008, and also claims the benefit of U.S. Provisional Application Ser. Nos. 60/976,583 filed on Oct. 1, 2007, and 60/982,436, filed on Oct. 25, 2007.

TECHNICAL FIELD

The present invention relates to an orthogonal frequency division multiplexing (OFDM) communication system, and more particularly, to a method for transmitting and receiving an acknowledgement (ACK)/negative acknowledgement (NAK) signal in an OFDM communication system.

BACKGROUND ART

In a mobile communication system, when a transmitting side transmits a packet, a receiving side may inform the transmitting side whether or not the packet has been successfully received. If the reception of the packet is successful, the receiving side transmits an acknowledgement (ACK) signal to cause the transmitting side to transmit a new packet. If the reception of the packet fails, the receiving side transmits a negative acknowledgement (NAK) signal to cause the transmitting side to re-transmit the packet. Such a process is called an automatic repeat request (ARQ) operation.

Meanwhile, hybrid ARQ (HARQ), which is a combination of the ARQ operation and a channel coding scheme, has been proposed to lower an error rate by combining a re-transmitted packet with a previously received packet and to improve the overall efficiency of the system. In order to increase throughput of the system, HARQ demands a rapid ACK/NAK response from the receiving side compared with a conventional ARQ operation. Therefore, the ACK/NAK in HARQ is transmitted by a physical channel signaling method. A method for achieving HARQ may be broadly classified into two schemes.

The first scheme is chase combining (CC). Chase combining serves to transmit a packet during re-transmission using the same modulation method and the same coding rate as a modulation method and a coding rate used to transmit a previous packet. The second scheme is incremental redundancy (IR) which serves to transmit a packet during re-transmission using a different modulation method and a different coding rate from a modulation method and a coding rate used to transmit a previous packet. When using the second scheme, the receiving side can additionally obtain a coding diversity gain, thereby increasing the processing capacity of the system.

DISCLOSURE

[Technical Problem]

An object of the present invention provides a method for transmitting and receiving an ACK/NAK signal in an OFDM communication system. Another object of the present invention provides a method for transmitting and receiving an ACK/NAK signal by evenly distributing OFDM symbols allocated for transmission of the ACK/NAK signal in an OFDM communication system.

[Technical Solution]

The object of the present invention can be achieved by providing a method for receiving a downlink ACK/NAK signal in an OFDM communication system. The method include receiving ACK/NAK signals and repetitions of the ACK/NAK signals mapped to one or more OFDM symbols which are allocated for transmission of a plurality of ACK/NAK signals within one sub-frame, and confirming receipt of the ACK/NAK signals, wherein the OFDM symbols for each ACK/NAL signal are determined according to the repetition of the ACK/NAK signals, and frequency regions for the ACK/NAK signals within the OFDM symbols are different from frequency regions for the repetition of the ACK/NAK signals within the OFDM symbols.

In another aspect of the present invention, provided herein is a method for receiving a downlink ACK/NAK signal in an OFDM communication system. The method includes receiving ACK/NAK signals and repetitions of the ACK/NAK signals mapped to one or more OFDM symbols which are allocated for transmission of a plurality of ACK/NAK signals within one sub-frame, and confirming receipt of the ACK/NAK signals, wherein frequency regions are determined according to the repetition of the ACK/NAK signals, and an OFDM symbol of the ACK/NAK signals is different from an OFDM symbol of the repetition of the ACK/NAK signals.

In still another aspect of the present invention, provided herein is a method for transmitting an ACK/NAK signal in an OFDM communication system. The method includes determining one or more ACK/NAK signal groups by multiplexing a plurality of ACK/NAK signals, determining repetition in the unit of the one or more ACK/NAK signal groups, mapping the ACK/NAK signal groups and the determined repetition to one or more OFDM symbols allocated for transmission of the ACK/NAK signals within one sub-frame, and transmitting the ACK/NAK signal groups and the determined repetition, wherein ACK/NAK signal groups included in the determined repetition include at least one ACK/NAK signal which is different from ACK/NAK signals of the ACK/NAK signal groups.

In a further aspect of the present invention, provided herein is a method for transmitting an ACK/NAK signal in an OFDM communication system. The method includes sequentially mapping an ACK/NAK signal and one or more repetitions of the ACK/NAK signal to different frequency regions of one or more OFDM symbols allocated for transmission of the ACK/NAK signal within one sub-frame, and transmitting the ACK/NAK signal and the one or more repetitions of the ACK/NAK signal, wherein a plurality of ACK/NAK signals is transmitted within one sub-frame and each of the plurality of ACK/NAK signals is sequentially mapped to the one or more OFDM symbols.

In the above aspects of the present invention, the plurality of ACK/NAK signals transmitted through each OFDM symbol may have a fair distribution over the entire region of the OFDM symbol.

The frequency regions to which the plurality of ACK/NAK signals transmitted through the OFDM symbols is mapped may be determined by a specific mapping scheme or an interleaving scheme. The interleaving scheme may be performed according to the OFDM symbols or the frequency regions.

The ACK/NAK signals may include one or more an ACK/NAK signal group in which the plurality of ACK/NAK signals is multiplexed. The plurality of ACK/NAK signals may be discriminated by one of an orthogonal code, a quasi-orthogonal code, and an orthogonal phase component. The ACK/NAK signals constituting the multiplexed ACK/NAK signal group may vary according to the repetition of the ACK/NAK signals.

The one or more OFDM symbols allocated for transmission of the ACK/NAK signals may be determined by a part of the one or more OFDM symbols allocated for transmission of a control signal within one sub-frame.

The one or more OFDM symbols may be divided into one or more OFDM symbol regions to apply the same or different mapping scheme to the one or more OFDM symbols according to the OFDM symbol regions.

[Advantageous Effects]

According to a method for transmitting and receiving an ACK/NAK signal in an OFDM communication system, OFDM symbols allocated for transmission of the ACK/NAK signal can be evenly distributed.

Especially, OFDM symbols are divided to be distributed in one or more frequency regions and the ACK/NAK signal is repeatedly transmitted through different frequency regions, thereby obtaining a frequency diversity gain.

Further, interference between a plurality of ACK/NAK signals can be reduced by evenly distributing the ACK/NAK signals transmitted by OFDM symbols over the entire band.

In addition, when one or more ACK/NAK signals are repeated in the form of a multiplexed ACK/NAK signal group, interference can be randomized by constructing different groups per repetition.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In one sub-frame, a part of OFDM symbols within the sub-frame are allocated for transmission of uplink/downlink control signals, and among the control signals, an ACK/NAK signal may be transmitted according to an HARQ scheme using the whole or part of the allocated OFDM symbols. A process for designating a corresponding time-frequency region in order to transmit the ACK/NAK signal, using partial time-frequency regions included in OFDM symbols allocated for transmission of the control signals or the ACK/NAK signal, may be referred to as a mapping process.

Moreover, in one sub-frame, a plurality of ACK/NAK signals may be transmitted as a response to uplink transmission by a plurality of users. In this case, a group comprised of a prescribed number of ACK/NAK signals among the ACK/NAK signals may be multiplexed using a code division multiple access (CDMA) method and then may be transmitted in the form of multiplexed ACK/NAK signals.

When transmitting the ACK/NAK signal group in the form of multiplexed ACK/NAK signals, a downlink wireless channel response characteristic between the multiplexed ACK/NAK signals should not be greatly varied in a time-frequency region in order to maintain orthogonality between different ACK/NAK signals. If the orthogonality is maintained, a receiving side can obtain satisfying reception performance without applying a special receiving algorithm such as a channel equalizer. Accordingly, it is desirable that the multiplexed ACK/NAK signals be transmitted within a time-frequency region in which a wireless channel response is not significantly varied.

However, if the wireless channel quality of any terminal is poor in a time-frequency region in which the ACK/NAK signal is transmitted, the ACK/NAK reception performance of the terminal may also be greatly lowered. Accordingly, within one sub-frame, a method of repeatedly transmitting the ACK/NAK signal transmitted to any terminal over a plurality of separate time-frequency regions separated in time-frequency axes may be applied. The receiving side receives the repeatedly transmitted ACK/NAK signals, thereby obtaining a time-frequency diversity gain.

In particular, it is desirable that the ACK/NAK signal and repetition thereof be transmitted by being evenly mapped in OFDM symbols allocated for transmitting the ACK/NAK signal and in the entire frequency band of each OFDM symbol. For example, the entire frequency band of each OFDM symbol is divided into a plurality of frequency regions and the same ACK/NAK signal is repeatedly transmitted through different frequency regions of OFDM symbols, thereby ensuring a frequency diversity gain. The same ACK/NAK signal refers to a corresponding ACK/NAK signal and repetition thereof, when one ACK/NAK signal and the ACK/NAK signal are repeatedly transmitted once or more. The ACK/NAK signal may be repeated in the form of multiplexed ACK/NAK signals which are multiplexed by a plurality of ACK/NAK signals.

Figure 1:
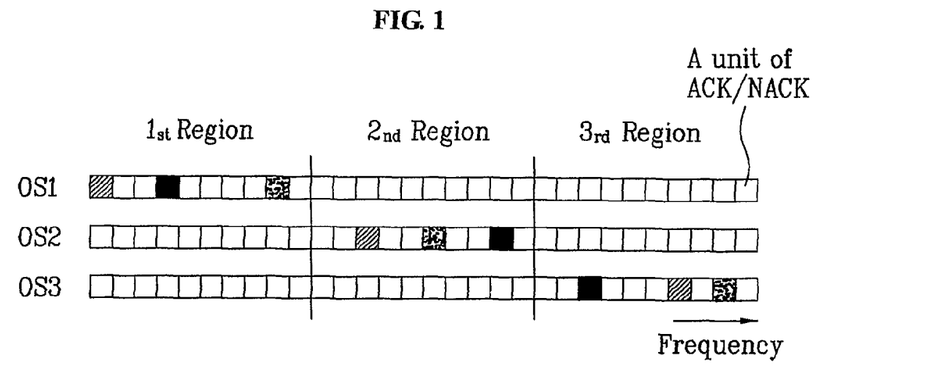
FIG. 1 is a view illustrating a method for mapping ACK/NAK signals to a plurality of OFDM symbols in an OFDM communication system.

FIG. 1 is a view illustrating a method for mapping ACK/NAK signals to a plurality of OFDM symbols in an OFDM communication system.

In repeatedly transmitting a plurality of ACK/NAK signals, if a time-frequency region for transmission of a plurality of ACK/NAK signals and its repetitions is determined with the same rule with respect to the plurality of ACK/NAK signals, the ACK/NAK signals may be concentrated in a partial region within an OFDM symbol.

As illustrated in FIG. 1 for example, in a first OFDM symbol OS1, ACK/NAK signals may be concentrated in a first frequency region. In a second OFDM symbol OS2, ACK/NAK signals may be concentrated in a second frequency region. In a third OFDM symbol OS3, ACK/NAK signals may be concentrated in a third frequency region.

Such mapping may have a negative influence on downlink transmission of a neighboring cell because interference, which is created by the ACK/NAK signals with respect to the neighboring cell, is concentrated in a specific frequency region. Hence, the present invention proposes a method in which ACK/NAK signals transmitted through one OFDM symbol have a fair distribution over the entire frequency band and each ACK/NAK signal is repeatedly transmitted through different frequency regions.

Throughout the drawings which are referred to in the above and following description, a box denotes a basic unit to which an ACK/NAK signal can be mapped and a marked box denotes a basic ACK/NAK signal unit to which an ACK/NAK signal has been actually mapped. Especially, boxes marked with the same shape indicate that the same ACK/NAK signal has been mapped. In the case where an ACK/NAK signal group is multiplexed for transmission, a box denotes a basic unit to which an ACK/NAK signal in a multiplexed form can be mapped. Especially, boxes marked with the same shape indicate that a multiplexed ACK/NAK signal including the same ACK/NAK signal group has been actually mapped. That is, it is apparent that an ACK/NAK signal may be interpreted as an ACK/NAK signal group.

<First Embodiment: Determination of OFDM Symbol>

In one sub-frame, when an ACK/NAK signal transmitted to any terminal is repeatedly transmitted through a plurality of different time-frequency regions, it is desirable that the ACK/NAK signal be repeatedly transmitted through different OFDM symbols. When a plurality of OFDM symbols is allocated for transmission of the ACK/NAK signal, examples of methods for determining OFDM symbols for each ACK/NAK signal or repetition thereof are indicated in the following Equation 1 an Equation 2.

$$k = j \bmod N_{OS} \quad \text{[Equation 1]}$$

$$k = (i+j) \bmod N_{OS} \quad \text{[Equation 2]}$$

In Equation 1 and Equation 2, k denotes an OFDM symbol index, i denotes an ACK/NAK signal index, j denotes a repetition index, and $N_{OS}$ denotes the number of OFDM symbols allocated for transmitting an ACK/NAK signal.

Equation 1 indicates the case where OFDM symbols are sequentially allocated according to the repetition of the ACK/NAK signal. Equation 2 indicates the case where OFDM symbols are sequentially allocated according to the repetition of the same ACK/NAK signal. In Equation 2, the ACK/NAK signal index is additionally considered when determining the OFDM symbols so that the order of allocating the OFDM symbols varies according to ACK/NAK signals.

Figure 2:
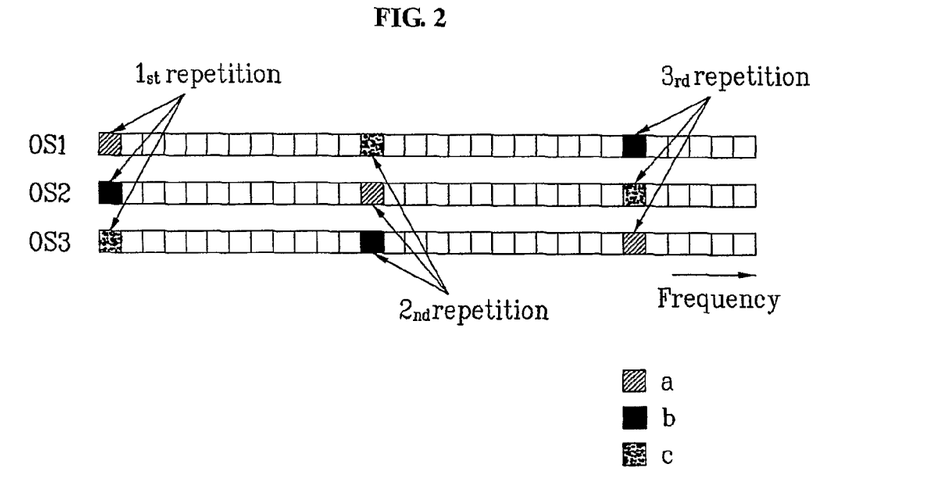
FIG. 2 is a view illustrating a method of mapping ACK/NAK signals to a plurality of OFDM symbols in an OFDM communication system according to an exemplary embodiment of the present invention.

FIG. 2 is a view illustrating a method of allocating OFDM symbols with respect to a plurality of ACK/NAK signals and the repetition of each ACK/NAK signal according to the above Equation 2.

Referring to FIG. 2, in the case of the first ACK/NAK signal 'a', OFDM symbols are sequentially allocated to each of the repetitions of the first ACK/NAK signal 'a' starting from the first OFDM symbol 'OS1'. In addition, in the case of the second ACK/NAK signal 'b', OFDM symbols are sequentially allocated to each of the repetitions of the second ACK/NAK signal 'b' starting from the second OFDM symbol 'OS2'. Moreover, in the case of the third ACK/NAK signal 'c', OFDM symbols are sequentially allocated to each of the repetitions of the third ACK/NAK signal 'c' starting from the third OFDM symbol 'OS3'.

In FIG. 2, a total of three OFDM symbols are allocated for transmission of the ACK/NAK signals, when each of three ACK/NAK signals 'a', 'b', and 'c' is repeatedly transmitted three times. However, the number of ACK/NAK signals, the number of repetitions of the ACK/NAK signals, and the number of OFDM symbols may be modified.

The ACK/NAK signals according to the determined OFDM symbols may be evenly mapped over the entire band within each OFDM symbol. Respective ACK/NAK signals within each OFDM symbol may be mapped to time-frequency regions to be farthest separated from each other.

<Second Embodiment: Frequency Region>

Figure 3:
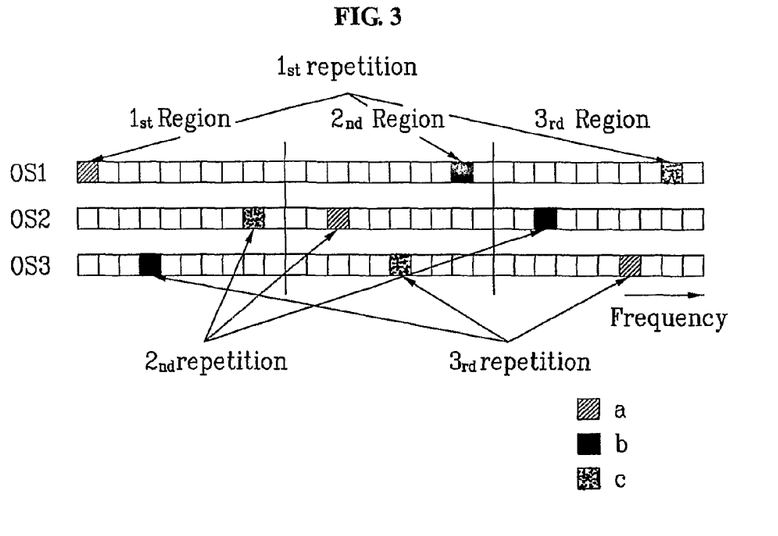
FIG. 3 is a view illustrating a method of mapping ACK/NAK signals to a plurality of OFDM symbols in an OFDM communication system according to an exemplary embodiment of the present invention.
Figure 4:
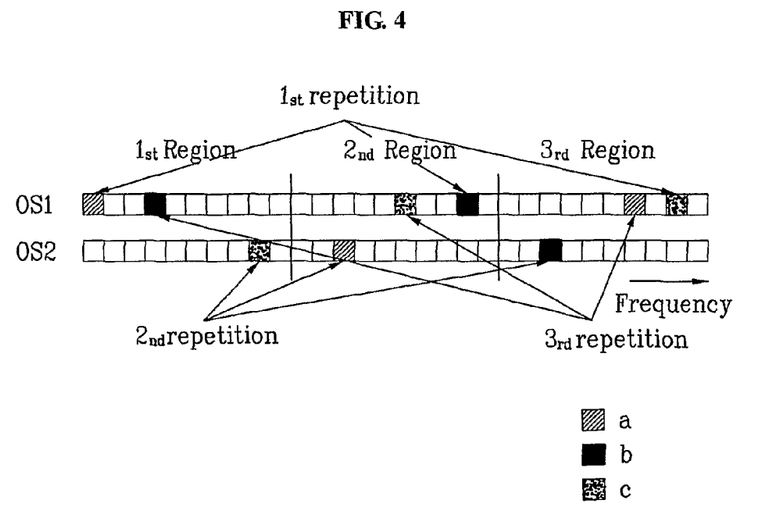
FIG. 4 is a view illustrating a method of mapping ACK/NAK signals to a plurality of OFDM symbols in an OFDM communication system according to an exemplary embodiment of the present invention.

FIG. 3 and FIG. 4 are views illustrating methods for mapping ACK/NAK signals to a plurality of OFDM symbols according to an exemplary embodiment of the present invention.

According to this exemplary embodiment, OFDM symbols to which ACK/NAK signals are to be mapped are designated and then regions for mapping the ACK/NAK signals in the OFDM symbols are mixed, thereby achieving efficient mapping for a plurality of OFDM symbols. Moreover, the entire frequency band of each OFDM symbol is divided into a plurality of frequency regions so that the entire frequency band can be evenly used, and repetitions of the ACK/NAK signals are mapped to different frequency regions of the OFDM symbols.

For example, as shown in FIG. 3, a first repetition of each ACK/NAK signal transmitted to a corresponding sub-frame is mapped to a first OFDM symbol OS1. A second repetition of each ACK/NAK signal transmitted to a corresponding sub-frame is mapped to a second OFDM symbol OS2, and a third repetition of each ACK/NAK signal transmitted to a corresponding sub-frame is mapped to a third OFDM symbol OS3.

The following Equation 3 indicates an example of a method for determining an OFDM symbol and a frequency region according to the exemplary embodiment of the present invention.

$$k = j \bmod N_{OS}$$

$$l = (i+j) \bmod N_{zone} \quad \text{[Equation 3]}$$

In Equation 3, k denotes an OFDM symbol index, i denotes a repetition index, $N_{OS}$ denotes the number of OFDM symbols allocated for transmission of an ACK/NAK signal, l denotes a frequency region index, i denotes an ACK/NAK signal index, and $N_{zone}$ denotes the number of frequency regions dividing the entire frequency band of each OFDM symbol.

When an ACK/NAK signal is transmitted through $N_{OS}$ OFDM symbols and each OFDM symbol is comprised of $N_{zone}$ frequency regions, the OFDM symbol index k (where k=0,1,2, ..., $N_{OS}$-1) and the frequency region index l (where l=0,1,2, ..., $N_{zone}$-1) which are to map the j-th repetition (where j=0,1,2, ... ) of the i-th ACK/NAK signal (where i=0,1,2, ... ) may be determined by Equation 3.

According to Equation 3, the OFDM symbol index k is determined as a value obtained by modulo-operating the repetition index j with the number $N_{OS}$ of OFDM symbols allocated for transmission of the ACK/NAK signal. OFDM symbols can be sequentially allocated according to repetitions. The frequency region index l is determined as a value obtained by modulo-operating a sum of the repetition index j and the ACK/NAK signal index i with the number $N_{zone}$ of frequency regions. That is, frequency regions are sequentially allocated according to repetitions but ACK/NAK signals are allocated in different order. FIG. 3 and FIG. 4 show methods for mapping ACK/NAK signals to OFDM symbols according to Equation 3, when three ACK/NAK signals 'a', 'b', and 'c' are repeatedly transmitted three times through three frequency regions. In particular, FIG. 3 illustrates a method for mapping ACK/NAK signals to three OFDM symbols, and FIG. 4 illustrates a method for mapping the ACK/NAK signals to two OFDM symbols. Unlike in FIG. 3, in FIG. 4, a third repetition of each ACK/NAK signal is again mapped to the first OFDM symbol OS1.

As can be seen from FIG. 3 and FIG. 4, each ACK/NAK signal is repeatedly transmitted through different frequency regions, and each ACK/NAK signal is evenly mapped to each frequency region.

Figure 5:
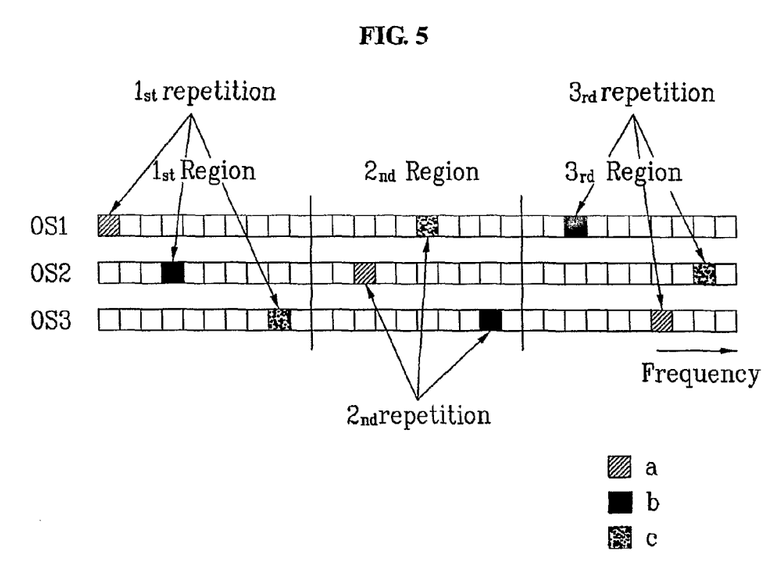
FIG. 5 is a view illustrating a method of mapping ACK/NAK signals to a plurality of OFDM symbols in an OFDM communication system according to an exemplary embodiment of the present invention.
Figure 6:
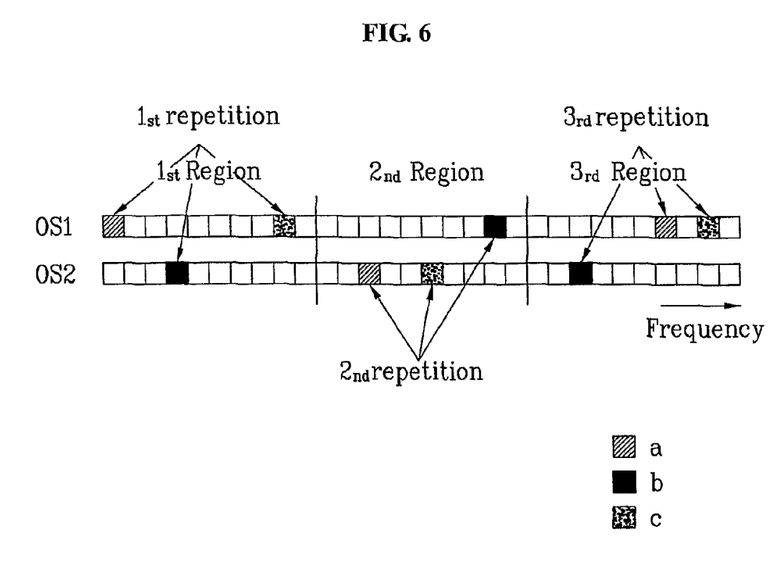
FIG. 6 is a view illustrating a method of mapping ACK/NAK signals to a plurality of OFDM symbols in an OFDM communication system according to an exemplary embodiment of the present invention.

FIG. 5 and FIG. 6 are views illustrating methods for mapping ACK/NAK signals to a plurality of OFDM symbols according to an exemplary embodiment of the present invention.

According to this exemplary embodiment, frequency regions are first designated to map repetitions, and then, OFDM symbols to map ACK/NAK signals are differently mixed in each frequency region, thereby achieving efficient mapping for a plurality of OFDM symbols.

For example, as shown in FIG. 5, a first repetition of each ACK/NAK signal transmitted to a corresponding sub-frame is mapped to a first frequency region. A second repetition of each ACK/NAK signal transmitted to a corresponding sub-frame is mapped to a second frequency region, and a third repetition of each ACK/NAK signal transmitted to a corresponding sub-frame is mapped to a third frequency region.

The same ACK/NAK signal may be mapped to different OFDM symbols within respective frequency regions, according to this embodiment. That is, the OFDM symbols may be sequentially allocated according to repetitions so that the OFDM symbols can be evenly allocated with respect to the same ACK/NAK signal.

For example, as illustrated in FIG. 5, a first ACK/NAK signal 'a' is mapped to a first OFDM symbol OS1 in a first frequency region, to a second OFDM symbol OS2 in a second frequency region, and to a third OFDM symbol OS3 in a third frequency region.

A second ACK/NAK signal 'b' is mapped to different OFDM symbols within respective frequency regions. Within each frequency region, the second ACK/NAK signal 'b' is mapped to a different OFDM symbol from the OFDM symbol to which the first ACK/NAK signal 'a' is mapped. For example, as shown in FIG. 5, the second ACK/NAK signal 'b' is mapped to the second OFDM symbol OS2 in the first frequency region, to the third OFDM symbol OS3 in the second frequency region, and to first OFDM symbol OS1 in the third frequency region.

The following Equation 4 indicates an example of a method for determining the OFDM symbol and frequency region according to the above-described embodiment.

$$l = j \bmod N_{zone}$$

$$k = (i+j) \bmod N_{OS} \qquad \text{[Equation 4]}$$

In Equation 4, l denotes a frequency region index, j denotes a repetition index, $N_{zone}$ denotes the number of frequency regions dividing the entire frequency band of each OFDM symbol, k denotes an OFDM symbol index, i denotes an ACK/NAK signal index, and $N_{OS}$ denotes the number of OFDM symbols allocated for transmission of an ACK/NAK signal.

When an ACK/NAK signal is transmitted through $N_{OS}$ OFDM symbols and each OFDM symbol is comprised of $N_{zone}$ frequency regions, the OFDM symbol index k (where k=0,1,2, ..., $N_{OS}$-1) and the frequency region index l (where l=0,1,2, ..., $N_{zone}$-1) which are to map the j-th repetition (where j=0,1,2, ... ) of the i-th ACK/NAK signal (where i=0,1,2, ... ) may be determined by Equation 4.

According to Equation 4, the frequency region index l is determined as a value obtained by modulo-operating the repetition index j with the number $N_{zone}$ of frequency regions so that frequency regions are sequentially allocated according to repetitions. The OFDM symbol index k is determined as a value obtained by modulo-operating a sum of the repetition index j and the ACK/NAK signal index i with the number $N_{OS}$ of OFDM symbols allocated for transmission of the ACK/NAK signal. Then the frequency regions are sequentially allocated according to repetitions but ACK/NAK signals are allocated in different order.

FIG. 5 and FIG. 6 show methods for mapping ACK/NAK signals to OFDM symbols according to Equation 4, when three ACK/NAK signals 'a', 'b', and 'c' are repeatedly transmitted three times through three frequency regions. In particular, FIG. 5 illustrates a method for mapping ACK/NAK signals to three OFDM symbols, and FIG. 6 illustrates a method for mapping the ACK/NAK signals to two OFDM symbols. Unlike in FIG. 5, in FIG. 6, a third repetition of each ACK/NAK signal is again mapped to the first OFDM symbol OS1.

As can be seen from FIG. 5 and FIG. 6, each ACK/NAK signal is repeatedly transmitted through different frequency regions, and ACK/NAK signals are evenly mapped to respective frequency regions in each OFDM symbol. Meanwhile, a time-frequency region in which an ACK/NAK signal is transmitted within each frequency region may be determined by a cell specific method to reduce an influence of interference between cells.

In this exemplary embodiment, the number of frequency regions dividing one OFDM symbol may be greater than or less than the number of repetitions of each ACK/NAK signal. Especially, if the number of frequency regions is greater than the number of repetitions of each ACK/NAK signal, the above-described method may be applied in such a manner that only a part of the frequency regions are considered with respect to different ACK/NAK signals.

The ACK/NAK signal may be mapped to any time-frequency region within the OFDM symbol and frequency region determined according to the exemplary embodiment of the present invention. Even in this case, it is desirable that ACK/NAK signals be mapped to different time-frequency regions according to OFDM symbols so that interference between ACK/NAK signals can be eliminated as much as possible.

<Third Embodiment: Interleaving>

Figure 7:
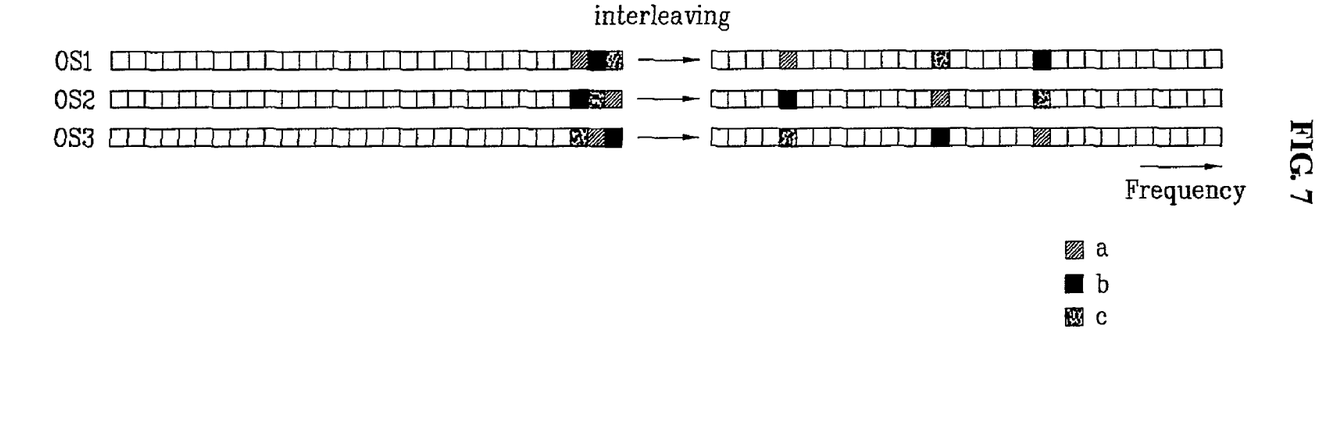
FIG. 7 is a view illustrating a method of mapping ACK/NAK signals to a plurality of OFDM symbols in an OFDM communication system according to an exemplary embodiment of the present invention.
Figure 8:
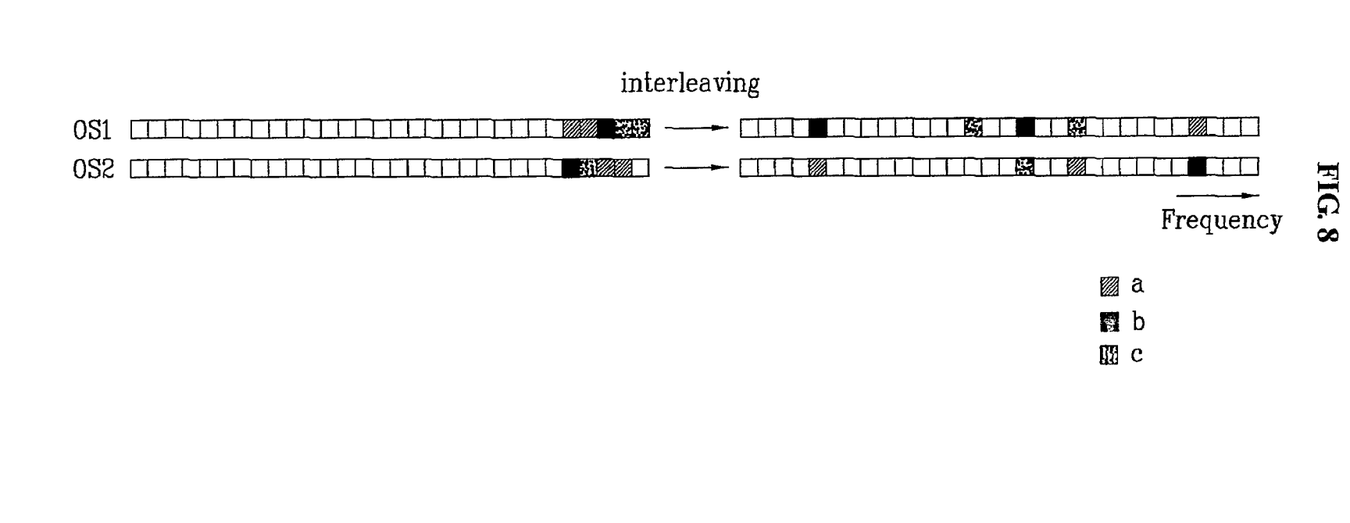
FIG. 8 is a view illustrating a method of mapping ACK/NAK signals to a plurality of OFDM symbols in an OFDM communication system according to an exemplary embodiment of the present invention.

FIG. 7 and FIG. 8 are views illustrating methods for mapping ACK/NAK signals to a plurality of OFDM symbols according to an exemplary embodiment of the present invention.

According to this exemplary embodiment, OFDM symbols are first designated to map repetitions according to repetitions and a region to map each ACK/NAK signal in each OFDM symbol is determined through an interleaving operation. An ACK/NAK signal and repetition thereof transmitted according to OFDM symbols may be determined by various methods including the methods described previously.

Namely, repetitive transmissions of each ACK/NAK signal are divided into a plurality of OFDM symbols, and ACK/NAK signals to be map to the OFDM symbols are interleaved together with virtual ACK/NAK signals of the same unit which actually do not map the ACK/NAK signals. Thereafter, the ACK/NAK signals are mapped to the OFDM symbols to disperse the ACK/NAK signals over a frequency band.

In this case, since interleaving operations for OFDM symbols are differently performed, the repetition of the same ACK/NAK signal can be prevented from being distributed at the same frequency location of each OFDM symbol. Alternatively, the input order of the ACK/NAK signals to an interleaver may vary according to OFDM symbols even though the same interleaving operation is performed with respect to a plurality of OFDM symbols, so that the repetitions of each ACK/NAK signal appear at different locations in OFDM symbols. Such an interleaving operation may be performed according to a random number pattern or a specific pattern, and each pattern may use a cell specific pattern in consideration of interference between cells. It is possible to perform a cell specific shift operation after performing cell common interleaving.

FIG. 7 and FIG. 8 show methods for mapping ACK/NAK signals to OFDM symbols by performing an interleaving operation according to OFDM symbols, when three ACK/NAK signals 'a', 'b', and 'c' are repeatedly transmitted three times through three frequency regions. In particular, FIG. 7 illustrates a method for mapping ACK/NAK signals to three OFDM symbols, and FIG. 8 illustrates a method for mapping the ACK/NAK signals to two OFDM symbols.

In FIG. 7, OFDM symbol for each ACK/NAK signal is determined according to repetitions, and ACK/NAK signals are transmitted with a fair distribution through the entire frequency band within an OFDM symbol by performing interleaving according to OFDM symbols. In particular, the input order of ACK/NAK signals to an interleaver is differently applied according to OFDM symbols. FIG. 8 illustrates an example of transmitting ACK/NAK signals through the entire band within an OFDM symbol with a fair distribution by performing interleaving. FIG. 8 has the same configuration as FIG. 7 except that three ACK/NAK signals and repetition thereof are allocated to only two OFDM symbols.

Such an interleaving scheme according to OFDM symbols may apply to a method for dividing each OFDM symbol into a plurality of frequency regions and mapping ACK/NAK signals to the frequency regions. That is, the ACK/NAK signals may be evenly distributed within the frequency regions. For example, if actual ACK/NAK signals and virtual ACK/NAK signals existing in each frequency region are used as an input unit to the interleaver, instead of actual ACK/NAK signals and virtual ACK/NAK signals existing in the entire frequency band, the same operation may be performed within each frequency region.

<Fourth Embodiment: OFDM Symbol Region>

Figure 9:
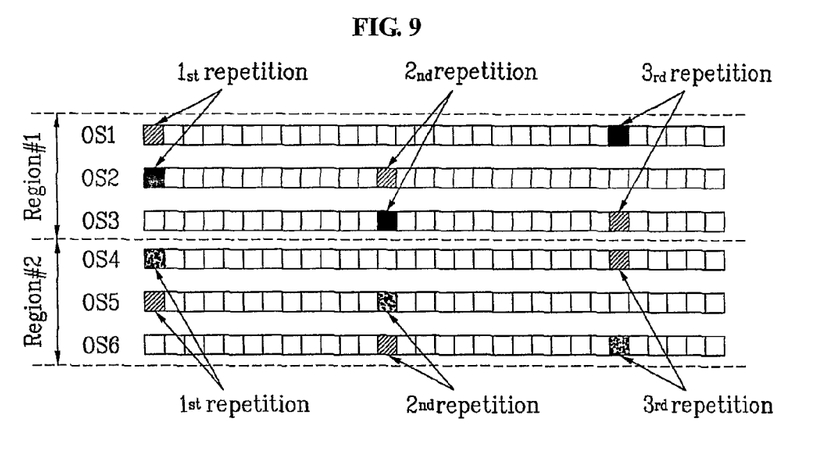
FIG. 9 is a view illustrating a method of mapping ACK/NAK signals to a plurality of OFDM symbols in an OFDM communication system according to an exemplary embodiment of the present invention.

FIG. 9 is a view illustrating methods for mapping ACK/NAK signals to a plurality of OFDM symbols according to an exemplary embodiment of the present invention.

According to this exemplary embodiment, OFDM symbols used to transmit control information including an ACK/NAK signal may be divided into a prescribed number of regions. In this case, an ACK/NAK signal mapping scheme may be applied to all regions or a part of regions. Alternatively, the ACK/NAK signal mapping scheme may be applied according to each region.

Referring to FIG. 9, if the number of OFDM symbols used to transmit control information including the ACK/NAK signal is six, each of regions region#1 and region#2 is designated in the unit of three OFDM symbols. If each ACK/NAK signal is repeated three times in each region, the locations of OFDM symbols to which ACK/NAK signals are mapped are changed according to the ACK/NAK signals and the number of repetitions of the ACK/NAK signals.

FIG. 9 is an illustrative example to aid understanding of the embodiment of the present invention and the embodiment of the present invention may be applied with respect to the number of OFDM symbols for transmitting control information including any ACK/NAK signals, a prescribed number of an OFDM symbol unit, and any number of repetitions. Moreover, the embodiment of the present invention may be applied to mapping and interleaving of other specific methods which can obtain a frequency diversity gain in the entire region or each region.

The method of the present invention in which the entire number of OFDM symbols is divided into several regions, each of which is used as the same structure may be applied to transmission of a general control channel in addition to ACK/NAK signals.

<Fifth Embodiment: Partial OFDM Symbol Region>

Figure 10:
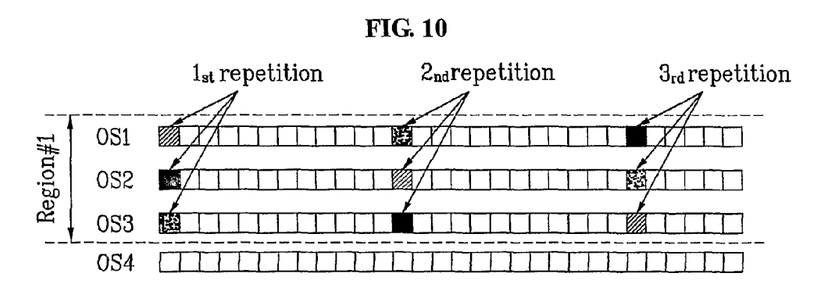
FIG. 10 is a view illustrating a method of mapping ACK/NAK signals to a plurality of OFDM symbols in an OFDM communication system according to an exemplary embodiment of the present invention.

FIG. 10 is a view illustrating a method for mapping ACK/NAK signals to a plurality of OFDM symbols according to an exemplary embodiment of the present invention.

According to this exemplary embodiment, only a part of OFDM symbols for transmitting control information including an ACK/NAK signal can be used to transmit ACK/NAK signals. In FIG. 10, if the number of OFDM symbols for transmitting control information including an ACK/NAK signal is four, only three OFDM symbols are used to transmit the ACK/NAK signal. Namely, other control information except for the ACK/NAK signal is transmitted using four OFDM symbols, whereas the ACK/NAK signal is transmitted using only three OFDM symbols. The number of OFDM symbols for transmitting the ACK/NAK signal may be modified within the range including OFDM symbols used to transmit an ACK/NAK channel.

The above-described various ACK/NAK signal mapping schemes or mapping and interleaving of other specific methods may be applied with respect to the OFDM symbol region used to transmit the ACK/NAK signal.

The method of this exemplary embodiment is advantageous in that a structure for transmitting a constant number of ACK/NAK signals can be maintained irrespective of a variation in the number of OFDM symbols for transmitting control information. For example, although the number of OFDM symbols for transmitting control information is changed to three from two, if the number of OFDM symbols for transmitting the ACK/NAK signals is the same as two, the same mapping scheme may be applied in an OFDM symbol region used to transmit the ACK/NAK signals irrespective of a variation in the number of OFDM symbols for transmitting the control information.

FIG. 10 shows just one example to aid the understanding of the present invention and the embodiment of the present invention may be applied irrespective of the number of OFDM symbols for transmitting any control information and the number of OFDM symbols for transmitting any ACK/NAK signals. Moreover, the embodiment of the present invention may use a part of OFDM symbols used to transmit control information to transmit ACK/NAK signals irrespective of a specific location.

<Sixth Embodiment: Multiplexing Group>

Figure 11:
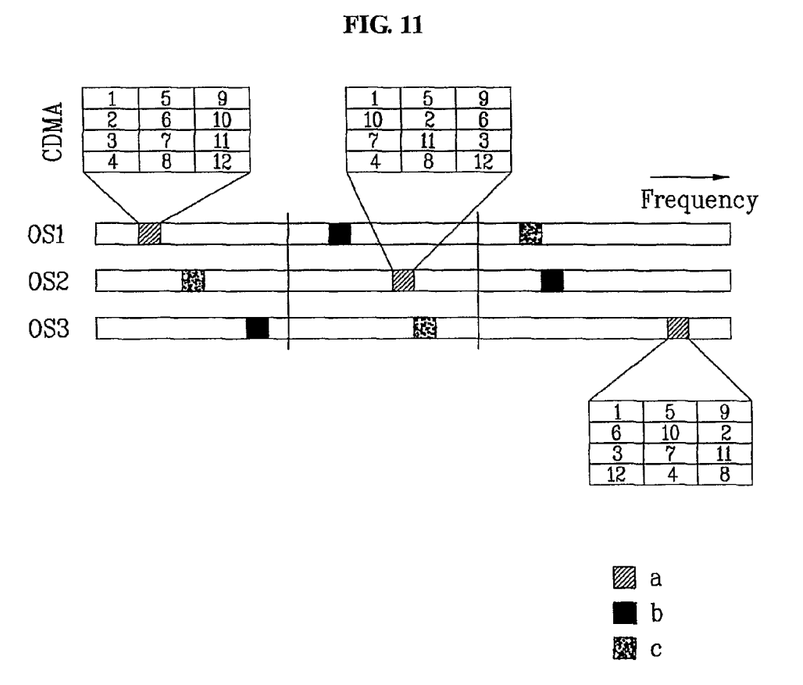
FIG. 11 is a view illustrating a method in which the configuration of a multiplexing group varies with the repetition of an ACK/NAK signal according to an exemplary embodiment of the present invention.

FIG. 11 is a view illustrating a method in which the configuration of a multiplexing group varies with the repetition of an ACK/NAK signal according to an exemplary embodiment of the present invention.

In a multi-carrier cellular mobile communication system, terminals belonging to one or a plurality of cells transmit an uplink data packet to a base station. That is, since a plurality of terminals within one sub-frame can transmit an uplink data packet, the base station must be able to transmit an ACK/NAK signal to a plurality of terminals.

If the base station multiplexes a plurality of ACK/NAK signals transmitted to the terminals within one sub-frame using CDMA within a partial time-frequency region of a downlink transmission band of the multi-carrier system, ACK/NAK signals with respect to other terminals are discriminated by an orthogonal code or a quasi-orthogonal code multiplied through a time-frequency region. If quadrature phase shift keying (QPSK) transmission is performed, ACK/NAK signals with respect to other terminals may be discriminated by different orthogonal phase components.

An ACK/NAK signal transmitted to any terminal within one sub-frame is repeatedly transmitted through time-frequency regions separated from a plurality of time-frequency axes, and in each time-frequency region, the ACK/NAK signal is multiplexed with an ACK/NAK signal transmitted to other terminals using a CDMA scheme. Accordingly, a receiving side can obtain a time-frequency diversity gain upon receiving the ACK/NAK signal.

As illustrated in FIG. 11, 12 ACK/NAK signals from number 1 to number 12 are CDMA-multiplexed by four groups, and three multiplexed ACK/NAK signals may be used in the unit of mapping and repeating. The following Table 1 shows an example of the configuration of CDMA groups.

TABLE 1

| First CDMA Group | Second CDMA Group | Third CDMA Group |
| --- | --- | --- |
| 1 | 5 | 9 |
| 2 | 6 | 10 |
| 3 | 7 | 11 |
| 4 | 8 | 12 |

In Table 1, numerals belonging to each CDMA group denote ACK/NAK signal indexes. That is, four ACK/NAK signals from number 1 to number 4 may be CDMA-multiplexed as a first CDMA group, four ACK/NAK signals from number 5 to number 8 may be CDMA-multiplexed as a second CDMA group, and four ACK/NAK signals from number 9 to number 12 may be CDMA-multiplexed as a third CDMA group.

In repeatedly transmitting the multiplexed ACK/NAK signals, the configuration of the CDMA groups may be differently applied according to repetitions to reduce interference. Referring to FIG. 11, if mapping shown in Table 1 is applied to a first repetition, different CDMA groups from the CDMA groups shown in Table 1, as indicated in Table 2, may be applied to a second repetition.

TABLE 2

| First CDMA Group | Second CDMA Group | Third CDMA Group |
| --- | --- | --- |
| 1 | 5 | 9 |
| 10 | 2 | 6 |
| 7 | 11 | 3 |
| 4 | 8 | 12 |

Comparing Table 1 with Table 2, ACK/NAK signals constituting CDMA groups of first and second repetitions are different from one another. Even in transmission of third repetition, CDMA groups different from the CDMA groups shown in Table 1 and Table 2 may be applied.

In the exemplary embodiments of the present invention, a description is made of a data transmission and reception relationship between a base station and a terminal. Here, the base station refers to a terminal node of a network communicating directly with the terminal. In some cases, a specific operation described as performed by the base station may be performed by an upper node of the base station. Namely, it is apparent that, in a network comprised of a plurality of network nodes including the base station, various operations performed for communication with the terminal may be performed by the base station, or network nodes other than the base station. The term 'base station' may be replaced with the term 'fixed station', 'Node B', 'eNode B' (eNB), 'access point', etc. The term 'terminal' may be replaced with the term 'user equipment' (UE), 'mobile station (MS)', 'mobile subscriber station' (MSS), etc.

It will be apparent that the present invention may be embodied by a combination of claims which do not have an explicit cited relation in the appended claims or may include new claims by amendment after application.

Further, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to apparatuses used for a wideband wireless mobile communication system.

The invention claimed is:

1. A method for receiving downlink acknowledgement/negative acknowledgement (ACK/NAK) signals in an orthogonal frequency division multiplexing (OFDM) communication system, the method comprising:
receiving a plurality of ACK/NAK signals and repetitions of the plurality of ACK/NAK signals that are mapped to one or more OFDM symbols; and
confirming receipt of the ACK/NAK signals and the repetitions, wherein the one or more OFDM symbols are allocated for transmission of the plurality of ACK/NAK signals and the repetitions of the plurality of ACK/NAK signals within one sub-frame, wherein an entire frequency band of each of the one or more OFDM symbols is divided into a plurality of frequency regions, wherein the one or more OFDM symbols corresponding to each of the plurality of ACK/NAK signals and the repetitions of the plurality of ACK/NAK signals are determined according to an equation $k=j \bmod N_{OS}$, and a frequency region for each of the plurality of ACK/NAK signals and repetitions of the plurality of ACK/NAK signals are determined according to an equation $l=(i+j) \bmod N_{zone}$, and where k denotes an OFDM symbol index, j denotes a repetition index, $N_{OS}$ denotes a number of the one or more OFDM symbols allocated for transmission of the plurality of ACK/NAK signals and the repetitions of the plurality of ACK/NAK signals, l denotes a frequency region index, i denotes an ACK/NAK signal index, and $N_{zone}$ denotes a number of the plurality of frequency regions.

2. The method according to claim 1, wherein the plurality of ACK/NAK signals and the repetitions of the plurality of ACK/NAK signals that is transmitted via each of the one or more OFDM symbols has a fair distribution over an entire region of the one or more OFDM symbols.

3. The method according to claim 1, wherein the plurality of frequency regions to which the plurality of ACK/NAK signals and the repetitions of the plurality of ACK/NAK signals transmitted via the one or more OFDM symbols are mapped are determined by a specific mapping scheme or an interleaving scheme.

4. The method according to claim 3, wherein the interleaving scheme is performed according to the one or more OFDM symbols or the plurality of frequency regions.

5. The method according to claim 1, wherein:
the plurality of ACK/NAK signals and the repetitions of the plurality of ACK/NAK signals include one or more ACK/NAK signal group in which the plurality of ACK/NAK signals and the repetitions of the plurality of ACK/NAK signals are multiplexed in order to determine a multiplexed ACK/NAK signal group.

6. The method according to claim 5, wherein the plurality of ACK/NAK signals and the repetitions of the plurality of ACK/NAK signals are distinguished by at least an orthogonal code, a quasi-orthogonal code, or an orthogonal phase component.

7. The method according to claim 5, wherein the plurality of ACK/NAK signals and the repetitions of the plurality of ACK/NAK signals of the multiplexed ACK/NAK signal group vary according to the repetitions of the plurality of ACK/NAK signals.

8. A method for receiving downlink acknowledgement/negative acknowledgement (ACK/NAK) signals in an orthogonal frequency division multiplexing (OFDM) communication system, comprising:
receiving a plurality of ACK/NAK signals and repetitions of the plurality of ACK/NAK signals mapped to one or more OFDM symbols; and
confirming receipt of the plurality ACK/NAK signals,
wherein the one or more OFDM symbols are allocated for transmission of the plurality of ACK/NAK signals and the repetitions of the plurality of ACK/NAK signals within one sub-frame, wherein an entire frequency band of each of the one or more OFDM symbols is divided into a plurality of frequency regions, wherein the frequency region corresponding to each of the plurality ACK/NAK signals and the repetitions of the plurality of ACK/NAK signals is determined according to an equation of $l=j \bmod N_{zone}$, and the one or more OFDM symbols corresponding to each of the plurality of ACK/NAK signals and the repetitions of the plurality of ACK/NAK signals is determined according to an equation of $k=(i+j) \bmod N_{OS}$, and wherein l denotes a frequency region index, j denotes a repetition index, $N_{zone}$ denotes a number of the plurality of frequency regions, k denotes an OFDM symbol index, i denotes an ACK/NAK signal index, and $N_{OS}$ denotes a number of the one or more OFDM symbols allocated for transmission of the plurality of ACK/NAK signals and the repetitions the plurality ACK/NAK signals.

9. The method according to claim 8, wherein the plurality of ACK/NAK signals and the repetitions of the plurality of ACK/NAK signals transmitted via each of the one or more OFDM symbols has a distribution over an entire region of the one or more OFDM symbols.

10. The method according to claim 8, wherein the plurality of frequency regions to which the plurality of ACK/NAK signals and the repetitions of the plurality of ACK/NAK signals transmitted via the one or more OFDM symbols are mapped are determined by a specific mapping scheme or an interleaving scheme.

11. The method according to claim 10, wherein the interleaving scheme is performed according to the one or more OFDM symbols or the plurality of frequency regions.

12. The method according to claim 8, wherein:
the plurality of ACK/NAK signals include one or more ACK/NAK signal group in which the plurality of ACK/NAK signals are included, and
the repetitions of the plurality of ACK/NAK signals are multiplexed to determine a multiplexed ACK/NAK signal group.

13. The method according to claim 12, wherein the plurality of ACK/NAK signals and the repetitions of the plurality of ACK/NAK signals is distinguished by at least an orthogonal code, a quasi-orthogonal code, or an orthogonal phase component.

14. The method according to claim 12, wherein the ACK/NAK signals of the multiplexed ACK/NAK signal group vary according to the repetitions of the plurality of ACK/NAK signals.

15. A method for transmitting acknowledgement/negative acknowledgement (ACK/NAK) signals in an orthogonal frequency division multiplexing (OFDM) communication system, comprising:
determining one or more ACK/NAK signal groups by multiplexing a plurality of ACK/NAK signals:
determining repetitions of the plurality of ACK/NAK signals in a unit of the ACK/NAK signal group;
mapping the one or more ACK/NAK signal groups and the determined repetitions of the plurality of ACK/NAK signals to one or more OFDM symbols allocated for transmission of the plurality of ACK/NAK signals within one sub-frame; and
transmitting the one or more ACK/NAK signal groups and the determined repetitions of the plurality of ACK/NAK signals,
wherein an entire frequency band of each of the one or more OFDM symbols is divided into a plurality of frequency regions wherein each of the one or more ACK/NAK signal groups included in the determined repetitions has a different configuration of ACK/NAK signals than other of the one or more ACK/NAK signal groups, wherein the one or more OFDM symbols for each of the one or more ACK/NAK signal groups and the determined repetitions of the plurality of ACK/NAK signals are determined according to an equation $k=j \mod N_{OS}$, and the plurality of frequency regions for each of the one or more ACK/NAK signal groups and the determined repetitions of the plurality of ACK/NAK signals are determined according to an equation $l=(i+j) \mod N_{zone}$, and where k denotes an OFDM symbol index, j denotes a repetition index, $N_{OS}$ denotes a number of the one or more OFDM symbols allocated for transmission of the one or more ACK/NAK signal groups and the determined repetitions of the plurality of ACK/NAK signals, l denotes a frequency region index, i denotes an ACK/NAK signal group index, and $N_{zone}$ denotes a number of the plurality of frequency regions.

16. The method according to claim 15, wherein the one or more OFDM symbols allocated for transmission of the plurality of ACK/NAK signals are determined by a portion of one or more OFDM symbols allocated for transmission of a control signal within one sub-frame.

17. The method according to claim 15, wherein the one or more OFDM symbols are divided into one or more OFDM symbol regions in order to apply a mapping scheme to the one or more OFDM symbols according to the one or more OFDM symbol regions.

18. A method for transmitting acknowledgement/negative acknowledgement (ACK/NAK) signals in an orthogonal frequency division multiplexing (OFDM) communication system, comprising:

sequentially mapping an ACK/NAK signal and one or more repetitions of the ACK/NAK signal to one or more OFDM symbols allocated for transmission of the ACK/NAK signal within one sub-frame; and transmitting the ACK/NAK signal and the one or more repetitions of the ACK/NAK signal, wherein an entire frequency band of each of the one or more OFDM symbols is divided into a plurality of frequency regions and the ACK/NAK signal and each of the repetitions is mapped onto different frequency regions of the one or more OFDM symbols, wherein a plurality of ACK/NAK signals is transmitted within one sub-frame and each of the plurality of ACK/NAK signals is sequentially mapped to the one or more OFDM symbols with different order, and wherein the frequency region corresponding to each of the ACK/NAK signals and the repetitions of the plurality of ACK/NAK signals is determined according to an equation $l=j \mod N_{zone}$ and the one or more OFDM symbols corresponding to each of the plurality of ACK/NAK signals and the repetitions of the plurality of ACK/NAK signals is determined according to an equation $k=(i+j) \mod N_{OS}$, and wherein l denotes a frequency region index, j denotes a repetition index, $N_{zone}$ denotes a number of the plurality of frequency regions, k denotes an OFDM symbol index, i denotes an ACK/NAK signal index, and $N_{OS}$ denotes a number of the one or more OFDM symbols allocated for transmission of the plurality of ACK/NAK signals and the repetitions of the plurality of ACK/NAK signals.

* * * * *